United States Patent [19]

Gasparro et al.

[11] Patent Number: 4,610,838
[45] Date of Patent: Sep. 9, 1986

[54] METHOD FOR REMOVING DEBRIS FROM A NUCLEAR REACTOR VESSEL

[75] Inventors: Michael R. Gasparro, Penn Hills; Anthony P. Besterci, Jr., Monroeville, both of Pa.

[73] Assignee: Westinghouse Electric Corp., Pittsburgh, Pa.

[21] Appl. No.: 634,726

[22] Filed: Jul. 26, 1984

[51] Int. Cl.$^4$ .................. G21C 17/00; G21C 19/42
[52] U.S. Cl. .................. 376/248; 376/313; 376/310
[58] Field of Search .................. 15/1.7, 304; 376/310, 376/313, 309, 249, 248, 316, 308

[56] References Cited

U.S. PATENT DOCUMENTS 1,305,564  6/1919  Purvis .
3,780,571 12/1973  Wiesener .
3,809,608  5/1974  Katz et al. .
4,309,583  1/1982  Krauss et al. .
4,376,602  3/1983  Landmark et al. .

Primary Examiner—Deborah L. Kyle
Assistant Examiner—John S. Maples
Attorney, Agent, or Firm—Daniel C. Abeles

[57] ABSTRACT

A method for extracting debris from the bottom of a water-filled nuclear reactor vessel. The method includes steps of removing the vessel closure head, upper internals and at least some fuel assemblies from the reactor vessel to expose a flow hole which is contained in the lower core plate and which has a perimeter, wherein imaginary vertical projection lines extending from the perimeter define an obstructed volume between the lower core plate and the bottom of the vessel, lowering a pipe having an open free end into the vessel so that the pipe extends through the exposed flow hole in the lower core plate and has its free end in close proximity to the bottom of the vessel, applying suction to the end of the pipe remote from the open free end to withdraw water and debris from the bottom of the vessel through the pipe, and removing the debris from the water withdrawn from the vessel and discharging the debris-free water into a reservoir.

6 Claims, 2 Drawing Figures

METHOD FOR REMOVING DEBRIS FROM A NUCLEAR REACTOR VESSEL

BACKGROUND OF THE INVENTION

1. Field of the Invention

The invention relates to a method for removing debris from the bottom of a large water-filled vessel having internal mechanisms which obstruct the bottom of the vessel, and more particularly to a method for removing debris from the bottom of a nuclear reactor vessel without removing the entire core assembly or reactor components located below the core assembly.

2. Description of the Prior Art

In the course of operating and maintaining a nuclear reactor, such as a pressurized water reactor, it is possible for debris to build up in the cooling water circulating through the reactor vessel. Such debris has various sources. For example, normal wear within the vessel can generate bits of metal or broken parts which end up circulating with the cooling water. Further, a ruptured fuel tube could eject pieces of fuel pellets into the cooling water. Debris can also come from sources external to the reactor vessel. For example, metal particles generated during a welding repair to a steam generator connected to the closed loop cooling system of the reactor could get into the cooling water and circulate into the reactor vessel.

In a pressurized water reactor, cooling water enters the vessel through a nozzle located in the upper portion of the side wall of the vessel. An annulus created by the inside wall of the vessel and the core barrel provides a path for the incoming cooling water to flow down along the inside perimeter of the vessel wall toward the bottom of the vessel where it rises up through the central portion of the vessel, passing through the core assembly and other control apparatus within the vessel commonly referred to as reactor internals and exiting through an outlet nozzle positioned in the upper portion of the vessel side wall. Debris at the bottom of the vessel or otherwise circulating with the cooling water is thereby carried through the internals of the vessel where it could become lodged between parts. For example, particles of debris could get lodged between the fuel rods, and over a period of time cause extensive wear, resulting in a rupture of one or more fuel rods. Also, particles could get lodged between a control rod and its housing, causing failure of the control rod. Another area for potential problems due to debris in the cooling water is the drive lines which are connected to the control rods. The drive lines are used for moving the control rods in and out of the core assembly. There are spaces in the area of the drive lines as small as $6.25 \times 10^{-4}$ mm in which particles of debris could become lodged and cause mechanical problems.

It is known to use a filtration system to filter the cooling water during a refueling outage. This is done to improve the clarity of the water so that the internals of the reactor vessel can be more clearly seen through the water when performing the various tasks involved in the refueling operation. One such filtration system comprises a pump, motor and filter assembly which operates to take water from the reactor cavity, circulate it through the filter assembly to remove particles larger than the filter pore size, and return the clarified water to the reactor cavity. The intake for this known filtration system, however, is located near the top of the refueling cavity and thus does not operate to remove any debris which has settled to the bottom of the reactor vessel which is located below the refueling cavity floor. Accordingly, while the clarity of the water is improved for the refueling operation, once the reactor is put back into operation and the cooling water begins to circulate, the debris which has settled to the bottom of the vessel may circulate up through the reactor internals, presenting problems of the type previously discussed.

It is known from U.S. Pat. Nos. 3,809,608 and 4,309,583 to withdraw water from the bottom of a reactor vessel by means of a pump connected to a pipe which extends to the bottom of the vessel. However, in each of the above noted U.S. Patents the pumping mechanisms for removing water from the vessel are employed in conjunction with a complex heat-treating apparatus which is inserted into the vessel after all of the internals have been removed from the vessel. The heat-treating apparatus includes a seal for effecting a water-tight seal between the inner confines of the vessel and the refueling cavity so that after the heat-treating apparatus is inserted into the vessel the pumping mechanism can empty all of the water out of the vessel into the refueling cavity in preparation for the heat treatment to be applied to the reactor vessel wall. Accordingly, neither of these two U.S. patents address the problem of removing debris from the bottom of the reactor vessel without completely removing the reactor internals and without withdrawing all of the water from the reactor vessel.

For the purposes of the following description and the claims, the term upper reactor internals refers to the upper core plate and the reactor internals located above the upper core plate.

SUMMARY OF THE INVENTION

It is an object of the invention to provide a method for removing debris from the bottom of a large water-filled vessel without completely removing mechanisms from the vessel which obstruct the bottom of the vessel.

It is a further object of the invention to provide a method for removing debris from the bottom of a nuclear reactor vessel without completely removing the reactor internals.

The above and other objects are accomplished according to the invention which provides for a method of extracting debris from the bottom of a water-filled nuclear reactor vessel including the steps of removing the vessel closure head, upper internals and at least some fuel assemblies from the reactor vessel to expose a flow hole which is contained in the lower core plate and which has a perimeter, wherein imaginary vertical projection lines extending from the perimeter define an unobstructed volume between the lower core plate and the bottom of the vessel; lowering a pipe having an open free end into the vessel so that the pipe extends through the exposed flow hole in the lower core plate and has its free end in close proximity to the bottom of the vessel; applying suction to the end of the pipe remote from the open free end to withdraw water and debris from the bottom of the vessel through the pipe; and removing the debris from the water withdrawn from the vessel and discharging the debris-free water into a reservoir.

In a further aspect of the invention a plurality of pipes connected to a single pipe header are lowered to the bottom of the vessel through respective flow holes in the lower core plate and the suction is applied to the plurality of pipes via the single header pipe.

In another aspect of the invention a stop is connected to the pipe and the pipe is lowered into the reactor vessel through a flow hole until the stop rests on the lower core plate.

Other features of the invention will become apparent from the detailed description of the invention set forth below. It should be apparent from the foregoing, however, that the invention provides a method for removing debris from the bottom of a nuclear reactor vessel without removing either the entire core assembly or the internals of the vessel located below the core assembly. The method of the invention is thus particularly useful during a refueling operation or reactor shut-down for loose parts retrieval in which the reactor closure head and upper internals and usually at least the center fuel assemblies are removed from the vessel. With such apparatus removed, the flow holes located in the central portion of the lower core plate are exposed. The present invention is based upon the recognition that most of these flow holes are aligned with the reactor internals below the lower core plate making it possible to lower a rigid pipe through one of such flow holes to the bottom of the vessel, thus enabling the vacuuming of the bottom of the vessel without removing the entire core assembly and the internals located therebelow.

DESCRIPTION OF THE PREFERRED EMBODIMENT

Figure 1:
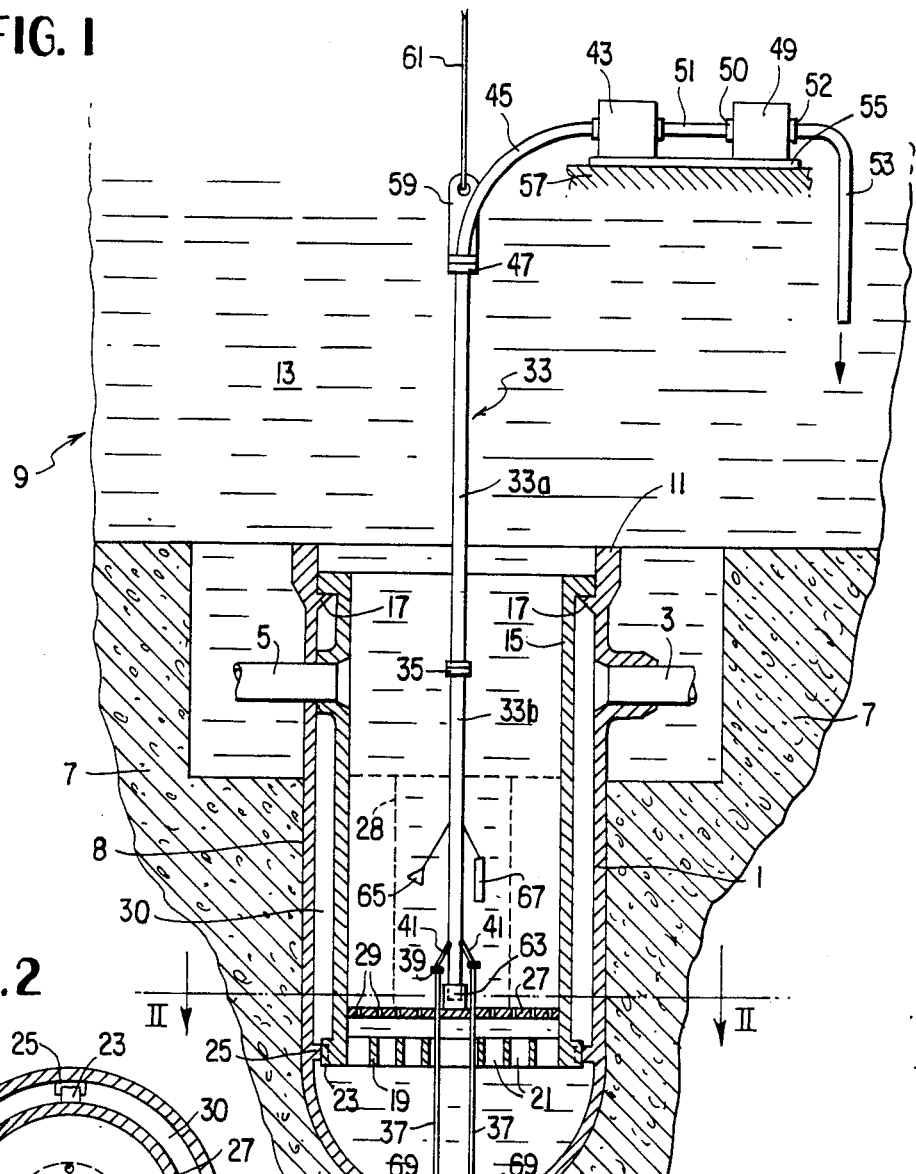
FIG. 1 is a partial side-sectional view of a nuclear reactor vessel with a pumping apparatus inserted in accordance with the method of the invention.

Referring to the drawings, there is shown in FIG. 1 an elongated, generally cylindrically-shaped nuclear reactor vessel 1 of the conventional design for use in a pressurized water-moderated nuclear reactor system. Vessel 1 has the usual hemispherical bottom, at least one cooling water inlet nozzle 3 and at least one cooling water outlet nozzle 5. Vessel 1 is located in a concrete primary shield annulus 7 forming a well 8 in which the vessel 1 is seated. An enlarged cavity or refueling cavity 9 (only partially shown in FIG. 1) is located above the vessel. An upper flange 11 of the vessel is positioned in a plane which is generally coextensive with the plane of the bottom of the refueling cavity 9. Vessel 1 is shown in FIG. 1 with the closure head, the upper internals and the center fuel rods of the core assembly removed.

FIG. 1 shows the refueling water 13 at a maximum level within the refueling cavity 9. During reactor operations, the refueling cavity 9 is maintained in a dry condition, and during refueling of the nuclear power plant the refueling cavity 9 is filled with water. The water level is maintained high enough to provide shielding which is sufficient for keeping the radiation levels within acceptable limits when fuel assemblies are removed from the vessel.

The reactor vessel 1 is sealed to the lower portion of refueling cavity 9 by a gasket seal ring (not shown) which prevents leakage of refueling water to the well 8 in which the vessel 1 is seated.

As in conventional designs a core barrel 15 is disposed within vessel 1, barrel 15 being supported by an inwardly extending flange 17 of vessel 1. Barrel 15 includes a bottom forging 19 having a plurality of vertical throughbores 21 and a plurality of projections 23 disposed about its circumference for engaging a corresponding number of key members 25 connected to vessel 1 for stabilizing the position of the barrel in the circumferential and radial directions. The upper internals which as noted above have been removed in FIG. 1, are supported by barrel 15. Core barrel 15 also supports the lower core plate 27 on which rest a plurality of upstanding fuel assemblies. Lower core plate 27 is connected to barrel 15 by connecting members which are not illustrated in FIG. 1. In FIG. 1 the central fuel assemblies have been removed leaving only the outer fuel assemblies which are not individually shown in FIG. 1 but are located within the space defined by dotted lines 28 and the inner surface of core barrel 15.

Lower core plate 27 includes a matrix of flow holes 29, about half of which are vertically aligned directly above respective ones of the throughbores 21 in bottom forging 19. Throughbores 21 are each larger in diameter than the flow holes in lower core plate 27 so that a plurality of flow holes in lower core plate 27 may be in registration with a single throughbore 21.

Figure 2:
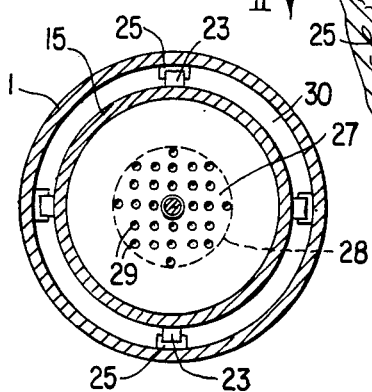
FIG. 2 is a cross-sectional view along line II—II of FIG. 1 showing the flow holes exposed in a portion of the lower core plate.

FIG. 2 illustrates the flow holes 29 in lower core plate 27 that would be observed looking down into vessel 1 of FIG. 1 with the upper internals and the central fuel assemblies removed. Flow holes in lower core plate 27 located outside dotted line 28 are obstructed by the outer fuel assemblies which in FIG. 1 have not been removed from the core. The removal of only the central fuel assemblies is quite typical in a refueling operation because the central fuel assemblies tend to become depleted more quickly than the outer fuel assemblies. Thus, during a refueling operation the central fuel assemblies are removed and the partially spent outer fuel assemblies are moved toward the center of the core.

In conventional pressurized water reactors, lower reactor internals, including vertical instrument columns and laterally extending tie plates for stabilizing the position of the instrument columns, are normally disposed below the bottom forging 19. Such lower internals are not shown in FIG. 1 for ease of illustration. It may be noted, however, that the vertical instrument columns, which extend from the bottom of the vessel through the bottom forging to connect with the fuel assemblies are generally located so as to not obstruct the flow holes in the lower core plate. Further, the tie-plates are also designed to have openings which are positioned such that most of the flow holes 29 that are aligned with openings 21 in bottom forging 19 are also in registration with such tie-plate openings. It is thus possible to lower a rigid pipe to the bottom of vessel 1 through those flow holes 29 that are vertically aligned with the openings in the bottom forging 19 and the tie-plates. In the event that the tie-plates block the vertical projection of any of the flow holes 29 aligned with openings 21 in bottom forging 19 it would of course be necessary in carrying out the method of the invention as described below to select only those flow holes which have an unobstructed projection down to the bottom of the reactor vessel.

An annular space 30 is defined between barrel 15 and vessel 1. When the reactor is in operation cooling water flows through inlet nozzle 3 and downwardly through annular space 30 to the bottom of vessel 1 where, due to the heat generated by the nuclear core, the water rises through the core assembly and exits through outlet nozzle 5. Heavier debris may be deposited at the bottom of vessel 1 while the lighter debris will circulate up through the internals of the vessel along with the flow of cooling water. When the flow of cooling water is cut off, for example during a refueling operation, circulating debris will settle, and much of it will fall to the bottom of the vessel 1.

As noted above, during a refueling operation the central fuel assemblies are generally removed from the vessel, exposing the flow holes 29 in lower core plate 27 as shown in FIG. 2. The present invention takes advantage of such exposed flow holes for removal of the debris 31 from the bottom of the reactor vessel.

Apparatus for implementing the method according to the invention comprises a pipe assembly including a pipe header 33 which may be in two or more sections. FIG. 1 illustrates two such sections 33a and 33b connected by a pipe connection 35. Preferably, two or more pipes 37 each having a smaller diameter than pipe header 33 are connected to lower pipe header section 33b via pipe connections 39 and y-sections 41 which are connected to the lower portion of pipe header section 33b.

Pipe header 33 is connected to a filter and trap assembly 43 by a preferably flexible pipe section 45 which is connected at the upper end of upper pipe header section 33a by a pipe connection 47. A trap sold by Pall Trinity Micro Corporation, Glen Cove, N.Y., as part number CO309 containing a filter made by the same company and sold under the trademark ULTIPOR GF may be used for filter and trap assembly 43. A water pump 49 is connected at its suction end 50 to filter and trap assembly 43 via a pipe section 51 and at its discharge end 52 to a pipe 53 for discharging the debris-free water into the refueling cavity 9. Pump 49 and filter and trap assembly 43 are preferably mounted on a movable skid 55 which is located on an operating deck 57 which is located, as is well known, above the refueling cavity.

The upper end of upper piper header section 33a has a cable connection member 59, which may be connected to pipe connection 47, for attaching a crane lifting cable 61 which is used to raise and lower the pipe assembly. Crane lifting cable 61 is connected at its other end to a manipulator crane (not shown) which is mounted on a floor mounted rail (also not shown) in a well known manner.

A header assembly stop 63 is mounted at the lower end of lower pipe header section 33b for the purpose of engaging lower core plate 27 to set the maximum lowering depth of the header pipe 33. Preferably stop 63 is adjustable for adjusting the depth to which header pipe 33 can be lowered.

Desirably, at least one underwater flood light 65 is mounted to pipe header 33 for illuminating the lower core plate region containing the flow holes through which pipes 37 are to pass. Preferably, a video camera 67 is provided which may also be mounted to pipe header 33 for producing video signals representing an image of the lower core plate region of interest in carrying out the method of the invention. Video camera 67 is connected to a video monitor (not shown) which may be mounted on the manipulator crane for observation by the crane operator. Electrical cables (not shown) for carrying electrical power and/or control signals to light 65 and camera 67 are preferably strung along the outside of pipe header 33 to appropriate connection points at the manipulator crane or on the operating deck 57.

The debris removal apparatus illustrated in FIG. 1 may be used to remove debris 31 from vessel 1 during a refueling operation, an in-service inspection or during any other operation which requires removal of the reactor closure head, upper internals and at least some of the fuel assemblies to expose a portion of the lower core plate, preferably in the central region, so as to provide access to flow holes 29 which are aligned with respect to bottom forging 19 and the reactor components therebelow (not shown) so as to provide access to the bottom of the vessel by pipes 37. During each of the foregoing servicing operations, when the reactor closure head and upper internals are removed, the refueling cavity 9 is simultaneously flooded so as to bring the water level up to just below operating deck 57. With the central fuel assemblies removed, the manipulator crane operator would, in accordance with the method of the invention, lower the pipe assembly into the vessel 1, and, preferably utilizing the light 65 and the video image provided by camera 67, align pipes 37 with selected flow holes for lowering pipes 37 therethrough. The crane operator would continue to lower the pipe assembly into vessel 1 until stop 63 rests on lower core plate 27.

Pipes 37 are dimensioned so as to pass through flow holes 29 with adequate clearance and so that their free ends 69 are in close proximity to the bottom of vessel 1 when stop 63 rests on lower core plate 27. After so positioning pipes 37, the operating personnel would turn on pump 49 to draw cooling water and debris 31 up the pipe assembly and through filter and trap assembly 43 where the debris is removed. The debris-free water is then discharged into refueling cavity 9 via pipe 53.

If the vacuuming draw of pipes 37 is not sufficient to remove all of the debris from the bottom of the vessel, the method of the invention may be repeated by removing the pipes 37 from the first selected flow holes and lowering pipes 37 through a different set of flow holes to vacuum a different areal portion of the bottom of the vessel.

The physical location of pump 49 and filter and trap assembly 43 may be modified to meet practical needs and safety requirements. For example, pump 49 may be located at the manipulator crane. Also, it may be desirable to mount filter and trap assembly 43 at a location to protect attending personnel from any radioactivity that may be in the debris removed from vessel 1. The filter and trap assembly may be mounted in line with pipe header 33 close to the lower core plate to help reduce radiation exposure to personnel. Alternatively, appropriate shielding may be provided for the filter and trap assembly 43 and/or pump 49.

It will be understood that the above description of the present invention is susceptible to various modifications, changes and adaptations, and the same are intended to be comprehended within the meaning and range of equivalents of the appended claims.

We claim:

1. A method for extracting debris from the bottom of a water-filled nuclear reactor vessel having an open upper end and containing a plurality of nuclear fuel assemblies, upper reactor internals disposed above the fuel assemblies, and a lower core plate supporting the fuel assemblies and having a plurality of flow holes, at least one of which flow holes has a perimeter, imaginary vertical projection lines extending from said perimeter defining an unobstructed volume between the lower core plate and the bottom of the vessel, and wherein a closure head is provided for closing the upper end of the vessel, said method comprising:

removing the closure head, upper internals, and at least some fuel assemblies from the reactor vessel to expose said at least one flow hole;

lowering a pipe having an open free end into the vessel so that the pipe extends through said exposed flow hole, and has its free end in close proximity to the bottom of the vessel;

applying suction to the end of the pipe remote from the open free end to withdraw water and debris from the bottom of the vessel through the pipe; and removing the debris from the water withdrawn from the vessel and discharging the debris-free water into a reservoir.

2. The method of claim 1, wherein said providing step includes providing the pipe with a stop and said lowering step includes lowering the pipe into the reactor vessel until the stop meets the lower core plate.

3. The method of claim 1, including positioning a video camera for viewing the pipe as it is lowered through the flow hole to the bottom of the vessel and connecting the video camera to a video monitor located for observation by personnel performing said lowering step.

4. The method of claim 1, including positioning an underwater light for illuminating the exposed flow hole in the lower core plate.

5. The method of claim 1, wherein said removing step includes exposing a plurality of flow holes in the lower core plate each having a perimeter, imaginary vertical projection lines extending from each said perimeter defining respective unobstructed volumes between the lower core plate and the bottom of the vessel, said lowering step includes lowering a plurality of pipes, each having an open free end, through a respective one of said exposed flow holes so that each of the free ends is in close proximity to the bottom of the vessel, and said applying step includes applying suction to the end of each pipe remote from a respective one of the open free ends to withdraw water and debris from the vessel through the plurality of pipes.

6. The method as defined in claim 5, including providing a single pipe header connected to the plurality of pipes and wherein said applying step includes applying suction to the remote ends of the plurality of pipes through the pipe header.

* * * * *